(12) United States Patent
Schott et al.

(10) Patent No.: US 9,776,373 B2
(45) Date of Patent: Oct. 3, 2017

(54) METHOD FOR BENDING A COMPOSITE SHEET AND SUCH A BENT COMPOSITE SHEET

(71) Applicants: Michael Schott, Oberhausen (DE); Arndt Marx, Mettlach-Orscholz (DE); Daniel Caspary, Abentheuer (DE)

(72) Inventors: Michael Schott, Oberhausen (DE); Arndt Marx, Mettlach-Orscholz (DE); Daniel Caspary, Abentheuer (DE)

(73) Assignees: ThyssenKrupp Steel Europe AG, Duisburg (DE); ThyssenKrupp System Engineering GmbH, Heilbronn (DE)

( * ) Notice: Subject to any disclaimer, the term of this patent is extended or adjusted under 35 U.S.C. 154(b) by 17 days.

(21) Appl. No.: 14/518,424

(22) Filed: Oct. 20, 2014

(65) Prior Publication Data

US 2015/0037534 A1    Feb. 5, 2015

Related U.S. Application Data

(63) Continuation of application No. PCT/EP2013/058271, filed on Apr. 22, 2013.

(30) Foreign Application Priority Data

Apr. 23, 2012 (DE) .......... 10 2012 103 543
Jul. 17, 2012 (DE) .......... 10 2012 106 420

(51) Int. Cl.
*B32B 3/04* (2006.01)
*B21D 5/04* (2006.01)
(Continued)

(52) U.S. Cl.
CPC .......... *B32B 3/04* (2013.01); *B21D 5/04* (2013.01); *B21D 5/042* (2013.01); *B21D 53/88* (2013.01);
(Continued)

(58) Field of Classification Search
CPC ....................................... B21D 5/042
(Continued)

(56) References Cited

U.S. PATENT DOCUMENTS

2004/0187542 A1    9/2004  Golovashchenko et al.
2008/0155804 A1*   7/2008  Lee ............... B21D 5/08
                                           29/34 R

FOREIGN PATENT DOCUMENTS

CN    1345639 A      4/2002
CN    101222986 A    7/2008
(Continued)

*Primary Examiner* — Brent O'Hern
(74) *Attorney, Agent, or Firm* — Reinhart Boerner Van Deuren P.C.

(57) ABSTRACT

The invention relates to a method for bending at least one edge of a composite sheet, which has at least two outer metallic layers and an inner plastic layer, in which the edge of the composite sheet is edge-bent in a first step and is bent into the finished form in at least one further method step. In addition, the invention relates to a correspondingly bent composite sheet. The object of making a method for bending a composite sheet available, in which cracks in the metallic layers of the composite sheet can be prevented and, at the same time, in which a seam can easily be provided, is achieved by using an edge-bending punch, a holding-down device and an edge-bending jaw during the edge-bending operation and by the edge-bending punch having a notch running in the bending direction below the bending edge of the edge-bending punch.

10 Claims, 3 Drawing Sheets

(51) Int. Cl.
*B21D 53/88* (2006.01)
*B32B 15/08* (2006.01)
*B62D 29/00* (2006.01)

(52) U.S. Cl.
CPC ............ *B32B 15/08* (2013.01); *B62D 29/008* (2013.01); *B32B 2250/03* (2013.01); *B32B 2250/40* (2013.01); *B32B 2605/00* (2013.01); *Y10T 428/2419* (2015.01)

(58) Field of Classification Search
USPC ........................................................ 428/121
See application file for complete search history.

(56) References Cited

FOREIGN PATENT DOCUMENTS

| | | |
|---|---|---|
| CN | 201880800 U | 6/2011 |
| CN | 202097296 U | 1/2012 |
| DE | 42 11 575 A1 | 10/1993 |
| DE | 44 35 719 C1 | 2/1996 |
| DE | 10 2010 016 914 A1 | 11/2011 |
| DE | 10 2010 048 589 A1 | 3/2012 |
| EP | 0 479 369 B1 | 4/1992 |
| FR | 2 760 983 A1 | 9/1998 |
| FR | 2 803 230 A1 | 7/2001 |
| JP | 63-123531 A | 5/1988 |
| JP | 02-112826 A | 4/1990 |
| JP | 03-077723 A | 4/1991 |
| JP | 05-000495 A | 1/1993 |
| JP | H05-131220 A | 5/1993 |
| JP | 2000051958 A | 2/2000 |
| JP | 2009-166078 A | 7/2009 |

\* cited by examiner

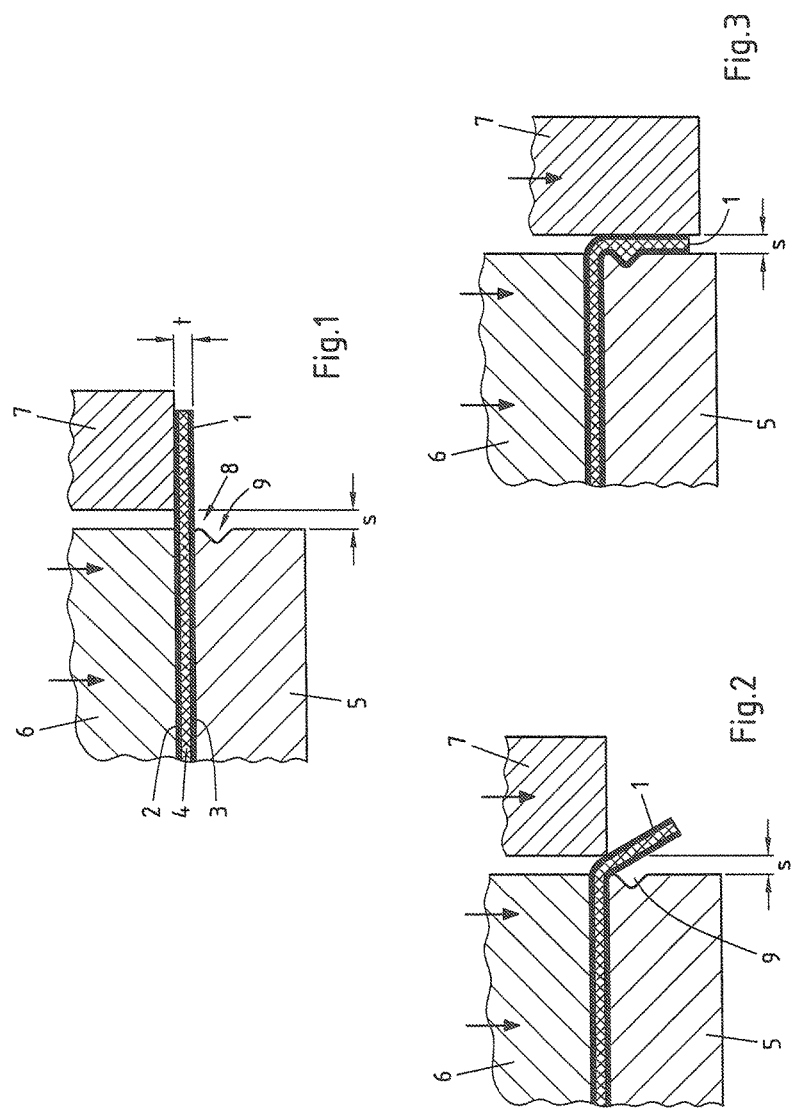

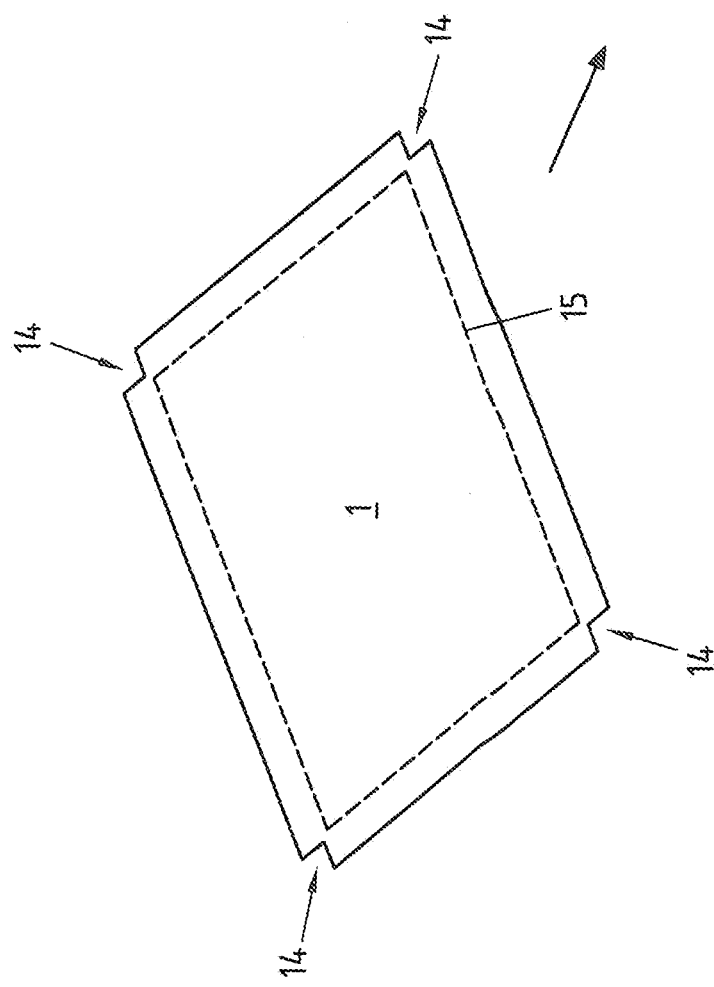
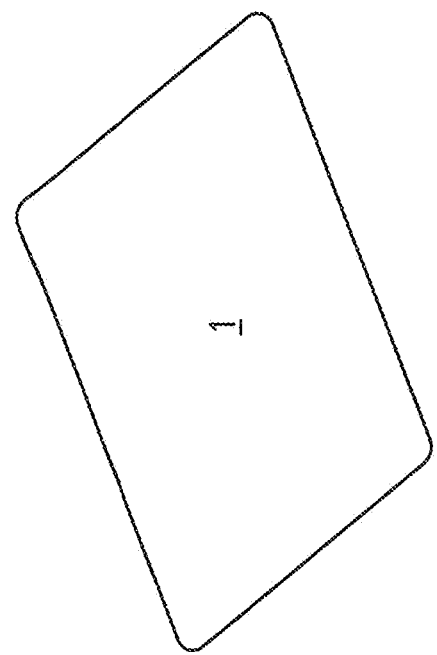

METHOD FOR BENDING A COMPOSITE SHEET AND SUCH A BENT COMPOSITE SHEET

CROSS-REFERENCE TO RELATED PATENT APPLICATIONS

This patent application is a continuation of PCT/EP2013/058271, filed on Apr. 22, 2013, which claims priority to German Application No. 10 2012 103 543.1, filed on Apr. 23, 2012 and German Application No. 10 2012 106 420.2, filed on Jul. 17, 2012, the entire teachings and disclosure of which are incorporated herein by reference thereto.

FIELD OF THE INVENTION

The invention relates to a method for bending at least one edge of a composite sheet, which has at least two outer metallic layers and an inner plastic layer, in which the edge of the composite sheet is edge-bent in a first step and is bent into the finished form in at least one further method step. In addition, the invention relates to a correspondingly bent composite sheet.

BACKGROUND OF THE INVENTION

The process of bending sheets in a plurality of sub-steps is already known. For example, the edges of composite sheets are bent round in sub-steps during folding by approximately 180°. In the conventional processes, the edge of the sheet is initially edge-bent to approximately 90° and then pre-folded to 120° to 130°. Subsequently, the seam is produced by bending the pre-folded area round to approximately 180°. Sheets can be joined one below the other, for example, by means of the seam. On the other hand, less sharp-edged component edges can also be produced by folding.

Furthermore, a method for bending composite sheets, in which a pivotable bending die is used and the bending punch has a recessed notch in the bending edge, is known from the German published patent application DE 10 2010 016 914 A1. It has become apparent that in the conventional production process, in which the bending edge is initially edge-bent to 90°, pre-folded and then folded into the finished form, composite sheets are prone to exhibiting cracks, so that the seam is defective. The method known from the mentioned published patent application for producing a seam of a composite sheet results in a delamination in the area of the bending edge. When the seam is being produced, then in the area of the bending edge under some circumstances a crack also occurs in the outer metallic layer or the bending behaviour of the metallic layer is uncontrolled.

Taking this situation as the starting point, the object forming the basis of the invention is to make a method for bending a composite sheet available, in which cracks in the metallic layers of the composite sheet can be prevented and, at the same time, in which a seam can easily be provided.

SUMMARY OF THE INVENTION

The above derived object is achieved according to a first teaching by a method, in which an edge-bending punch, a holding-down device and an edge-bending jaw are used during the edge-bending operation and the edge-bending punch has a notch running in the bending direction below the bending edge of the edge-bending punch.

It has become apparent that when an edge-bending punch is used, in particular with a small edge-bending radius, which has a notch below the bending edge, preferably in combination with a small inlet radius on the edge-bending jaw, cracks when bending the composite sheet can be prevented by a displacement of material into the notch, which is present below the bending edge, during the edge-bending operation, so that the pressure on the outer metallic layers of the composite sheet is reduced during the edge-bending operation. As a consequence, the outer metallic layers are not as heavily stressed, so that cracks in the outer metallic layers can be prevented.

According to a first embodiment, the inlet or edge-bending gap between the edge-bending punch and the edge-bending jaw corresponds to at least the overall thickness of the composite sheet or is greater than the overall thickness of the composite sheet. Process reliability can be increased as a result of this when bending the composite sheet, since the risk of jamming is considerably reduced.

Preferably, according to a further embodiment of the method, the composite sheet is edge-bent at right angles and subsequently bent further. On the one hand, with right-angled edge-bending, simple edge-bending tools, in particular a simple edge-bending jaw with a guide perpendicular to the sheet plane, can be used. On the other hand, the right-angled edge-bending also allows sufficient material to be inserted into the notch provided by the edge-bending punch.

Less sharp-edged composite sheets but also joining them to further components can be obtained by the edge-bent composite sheet being pre-folded in a further method step and subsequently folded into the finished form. As a result of the method according to the invention, cracks can be prevented in the outer metallic layers of the seam of the composite sheet with a high degree of process reliability.

If, according to a further embodiment, the composite sheet is cut to size at the corners before the edge-bending operation, for example in an upstream production step, and the cut-to-size composite blank is circumferentially edge-bent, pre-folded and folded into the finished form, then, for example, a composite sheet having a circumferential seam can be easily provided. A corresponding composite sheet can be used, for example, for a motor vehicle part, for example a vehicle roof, vehicle floor, vehicle door or an engine bonnet etc.

In order to provide the necessary strength in the composite sheet part, the outer metallic layers can consist of steel, of an aluminium alloy and/or of a magnesium alloy. It is also conceivable for different metallic layers to be used, for example the combination of a metallic layer consisting of an aluminium alloy and a steel. The thicknesses of the outer metallic layers are preferably 0.1 mm to 0.8 mm, preferably at most 0.5 mm, in particular at most 0.4 mm. The thinner the metallic layers are, the lower the weight of the composite sheet is too. A reduction in weight is particularly advantageous if the composite sheet is to be used in the automotive sector.

The plastic layer thicknesses are, for example, approximately 0.1 mm to 2.0 mm, preferably 0.2 mm to 1.2 mm, in particular 0.3 mm to 0.8 mm. Here too, the reduction in the plastic layer contributes to a reduction in the overall weight, even if this occurs to a lesser extent than that occurring in the reduction of the metallic layer thicknesses. In addition, however, the plastic layer thickness must provide additional properties, for example vibration damping and insulation. Both properties can be harmonised very well with plastic layer thicknesses of 0.3 mm to 0.8 mm.

Preferably, a thermoplastic material, for example a polyethylene, polyamide or a mixture of these, for example a PE-PA compound, is used for the plastic layer. The plastic layer consisting of a thermoplastic material can then be produced in a cost-effective manner. Furthermore, the thermoplastic properties of the plastic can be advantageously utilised when forming the composite sheet, for example when forming the composite sheet in the hot state, so that the thermoplastic material can be formed more easily.

As already previously mentioned, it is particularly advantageous to provide a folded composite sheet using a method according to the invention. The composite sheet produced using the method according to the invention does not exhibit, in particular on the seam, any cracks in the outer metallic layers.

Embodiments of the composite sheet according to the invention are particularly advantageous if they are part of a motor vehicle, part of an engine bonnet, of a boot lid, of a vehicle door, of a vehicle roof or of a vehicle floor. In the automotive sector, composite sheets are particularly advantageous due to their light weight, their low vibration, thermal insulation and their high strength with their own weight being low.

BRIEF DESCRIPTION OF THE DRAWINGS

The invention will be explained in more detail below by means of exemplary embodiments in conjunction with the figures.

FIGS. 1 to 3 show in a schematic, sectional view an exemplary embodiment of the method at three different points in time, FIG. 8 shows in a perspective, schematic illustration a cut-to-size composite sheet and FIG. 9 shows in a perspective illustration the cut-to-size composite sheet from FIG. 8 after a circumferential seam has been produced.

DETAILED DESCRIPTION OF THE INVENTION

Figure 4:
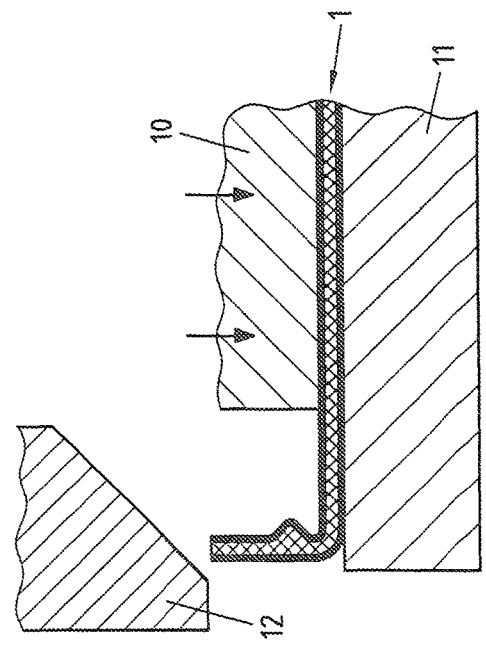
FIGS. 4 to 7 show an exemplary embodiment of the further method steps for producing a seam.
Figure 5:
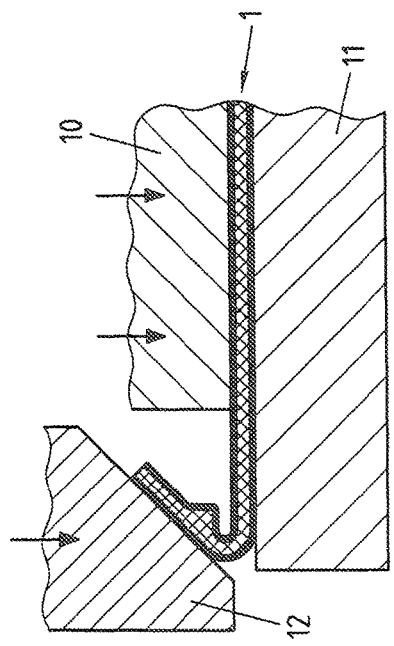

FIG. 1 firstly shows a composite sheet 1 in a schematic, sectional illustration, the composite sheet 1 consisting of two outer metallic layers 2, 3 and a plastic layer 4 arranged between the two outer metallic layers 2, 3. The outer metallic layers 2, 3 can, as already mentioned, consist, for example, of steel, of an aluminium alloy and/or of a magnesium alloy but can also consist of a combination of different metals. The thicknesses of the metallic layers are preferably 0.1 to 0.8 mm, particularly preferably 0.2 to 0.4 mm. The plastic layer 4, which is arranged between the two outer metallic layers 2, 3, can, for example, have a thickness of 0.1 to 2.0 mm, particularly preferably 0.3 to 0.8 mm and preferably consists of a thermoplastic material, for example polyamide and/or polyethylene.

In addition, in FIG. 1 an edge-bending punch 5, a holding-down device 6 and an edge-bending jaw 7 can be recognised. The edge-bending punch 5 has a bending edge 8, below which a notch 9 is arranged. The bending edge has an edge-bending radius which, for example, is less than 4 mm, preferably less than 3 mm, particularly preferably less than 2 mm. The edge-bending jaw 7, which has an inlet radius which is also, for example, less than 4 mm, preferably less than 3 mm, is arranged at a distance s from the holding-down device, so that an inlet gap or edge-bending gap with a width s is formed. By the interaction of the edge-bending jaw with a small inlet radius and the edge-bending punch with a small edge-bending radius, in the plastic layer initially a concentration of material occurs in the bending area. The width of the edge-bending gap s corresponds to at least the overall thickness t of the composite sheet, so that when the composite sheet is bent a displacement of material occurs in the composite sheet. The outer metallic layer 3 is hereby pressed into the notch 9 arranged below the bending edge 8. This preferably occurs along the entire bending edge. The outer metallic layer 3 is deformed in such a way that the composite sheet 1 is at least partly formed into the notch 9 of the edge-bending punch 5. The buckling of the composite sheet in the area of the notch 9 makes it possible for the synthetic material, which can exert very strong pressure on the outer metallic layer 2 of the composite sheet 1, to be displaced into the notch area and hence the pressure on the outer metallic layer decreases. As a result, narrow edge-bending radiuses of particularly preferably 2 mm and less in the composite sheet can be set during edge-bending in a way which is reliable in terms of the process. In this exemplary embodiment, an edge-bending jaw 7 with an inlet radius of 2 mm is illustrated, wherein the edge-bending radius is approximately 1 mm. The cracks which typically occur in the outer metallic layers when producing a seam are hereby prevented.

FIGS. 2 and 3 show in a schematic, sectional view how the composite sheet 1 is formed into the notch area of the edge-bending punch 5 during edge-bending by the edge-bending jaw 7.

By the interaction of the small edge-bending and inlet radiuses with the gap introduced below the bending edge of the edge-bending punch and an inlet or edge-bending gap s, additionally the springback can be reduced. The reduced springback behaviour is particularly advantageous for further process steps, for example for the folding operation.

Furthermore, it has become apparent that when using an edge-bending gap which corresponds to at least the overall thickness t of the composite sheet, the risk of jamming during the bending operation can be considerably reduced and hence the process reliability of the method can be improved.

Figure 6:
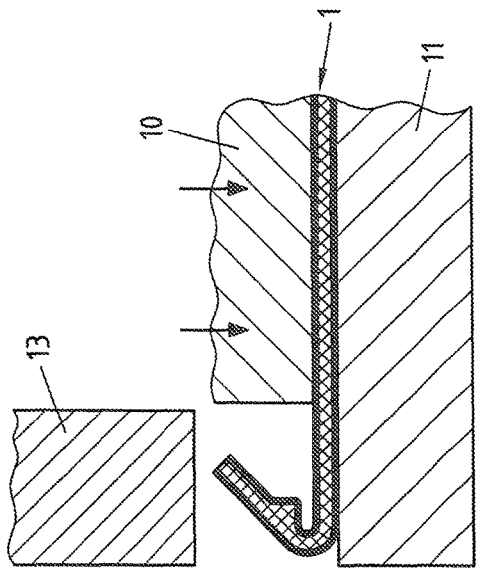
Figure 7:
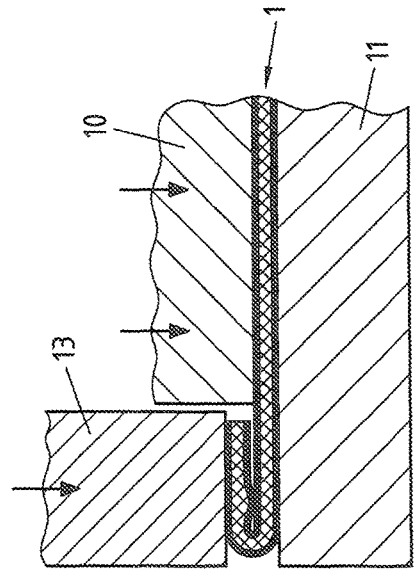

If now, according to a further exemplary embodiment, after edge-bending the composite sheet 1, a seam is to be produced, this can take place, for example, in such a way as is illustrated in FIGS. 4 to 7. For this purpose, the edge-bent composite sheet 1 is arranged, for example, in a subsequent device on a surface 11 and fixed in position with a holding-down device 10. Subsequently, the part of the edge sticking out at a 90° angle from the rest of the composite sheet is bent further round, for example to an angle of approximately 135° as is shown, for example, in FIG. 5, by means of a pre-folding punch 12. A simple, slanted punch is used for this purpose, which when moved downwards bends the edge already edge-bent to 90° further round. FIG. 6 now illustrates how a further stamp 13, which is now provided to produce the seam, is used, in order to fold the pre-folded edge of the composite sheet 1 into the finished form. This is illustrated in FIG. 7. It can be clearly recognised in FIGS. 4 to 7 that the composite sheet bulge is maintained on the inner side of the bending edge until the final seam is produced. The material present in the bulge means that from the inside of the composite sheet due to the bending operation the pressure on the outer metallic layers 2 of the composite sheet can be reduced and also that cracks can be prevented when the composite sheet is folded.

In FIG. 8, a composite sheet is now illustrated which is cut to size at its corners 14 such that in a method step the composite sheet 1 can be circumferentially edge-bent along the bending edge 15 and, for example, pre-folded and folded into the finished form.

The result of the folding process is illustrated in FIG. 9. The composite sheet 1, as can be recognised in FIG. 9, has distinctly rounded edges and can be used, for example, as a motor vehicle roof, floor, door, boot lid or engine bonnet or parts of the same.

The invention claimed is:

1. Method for bending at least one edge of a composite sheet, which has at least two outer metallic layers, and an inner plastic layer, the method comprising steps in which the edge of the composite sheet is edge-bent in a first step and is bent into a finished form in at least one further step, wherein an edge-bending punch, a holding-down device and an edge-bending jaw are used during the first step and the edge-bending punch has a notch running in the bending direction below a bending edge of the edge-bending punch.

2. Method according to claim 1, wherein an inlet or edge-bending gap between the edge-bending punch and the edge-bending jaw corresponds to at least an overall thickness of the composite sheet or is greater than an overall thickness of the composite sheet.

3. Method according to claim 1, wherein the composite sheet is edge-bent at right angles and subsequently bent further.

4. Method according to claim 1, wherein the edge-bent composite sheet is pre-folded in a further method step and subsequently folded into a finished form.

5. Method according to claim 1, wherein the composite sheet is cut to size at corners before the edge-bending operation and the cut-to-size composite blank is circumferentially edge-bent, pre-folded and folded into the finished form.

6. Method according to claim 1, wherein the at least two outer metallic layers are formed of one of steel, an aluminium alloy and of a magnesium alloy.

7. Method according to claim 1, wherein each of the at least two outer metallic layers has a thickness of 0.1 mm to 0.8 mm.

8. Method according to claim 1, wherein the inner plastic layer has a thickness of 0.1 mm to 2.0 mm.

9. Method according to claim 1, wherein the plastic layer consists of a thermoplastic material.

10. Method according to claim 1, wherein the composite sheet is bent into a part of a motor vehicle, of an engine bonnet, of a boot lid, of a vehicle door, of a vehicle roof, or of a vehicle floor.

* * * * *